US012723701B1

(12) United States Patent
Wang et al.

(10) Patent No.: US 12,723,701 B1
(45) Date of Patent: Sep. 1, 2026

(54) MONITOR SUPPORTING STRUCTURE BASED ON DUAL FOUR-BAR LINKAGE BALANCE CONTROL

(71) Applicant: Guangdong Vhood Electronic Technology Co., Ltd, Zhuhai (CN)

(72) Inventors: Bolin Wang, Zhuhai (CN); Haibin Lai, Zhuhai (CN)

(73) Assignee: Guangdong Vhood Electronic Technology Co., Ltd, Zhuhai (CN)

( * ) Notice: Subject to any disclaimer, the term of this patent is extended or adjusted under 35 U.S.C. 154(b) by 0 days.

(21) Appl. No.: 19/410,997

(22) Filed: Dec. 5, 2025

(30) Foreign Application Priority Data

Sep. 5, 2025 (CN) ........................ 202511261280.6

(51) Int. Cl.
*F16M 11/10* (2006.01)
*F16M 11/12* (2006.01)
*F16M 11/20* (2006.01)
*F16M 11/24* (2006.01)
*F16M 13/02* (2006.01)

(52) U.S. Cl.
CPC ......... *F16M 11/2092* (2013.01); *F16M 11/10* (2013.01); *F16M 11/126* (2013.01); *F16M 11/2014* (2013.01); *F16M 11/24* (2013.01); *F16M 13/022* (2013.01); *F16M 2200/044* (2013.01); *F16M 2200/063* (2013.01)

(58) Field of Classification Search
CPC ............ F16M 11/10; F16M 2200/063; F16M 2200/044; F16M 11/126; F16M 11/2092; F16M 11/2014; F16M 11/24; F16M 13/022
USPC ..................................................... 248/123.11
See application file for complete search history.

(56) References Cited

U.S. PATENT DOCUMENTS 4,657,217 A * 4/1987 Kiesel .................... A61G 15/14 248/283.1
6,233,791 B1 * 5/2001 Theis .................... F16L 3/1218 24/135 R
9,657,889 B1 * 5/2017 Chumakov ............ F16M 11/08
(Continued)

FOREIGN PATENT DOCUMENTS

BE 847690 A * 2/1977 ............ F16M 11/10
CN 207279177 U 4/2018
(Continued)

*Primary Examiner* — Taylor Morris
(74) *Attorney, Agent, or Firm* — Birchwood IP

(57) ABSTRACT

The present invention relates to the technical field of monitor supporting, comprising a monitor bearing assembly, a support adjustment assembly, and a plane fixing assembly. The support adjustment assembly comprises a connecting portion, a tension portion, and an auxiliary portion, the connecting portion comprises a first connecting end and a second connecting end, the tension portion is arranged between the first connecting end and the second connecting end and used for balancing a torque generated by the gravity of a monitor, and the auxiliary portion is arranged on one side of the second connecting end and used for adjusting a tension generated by the tension portion. There is no need to add additional friction to balance a difference between a supporting force of a four-bar linkage compression spring and a moment of the center of gravity of the monitor, realizing adaptation to a swinging angle of the support adjustment assembly.

8 Claims, 14 Drawing Sheets

(56) References Cited

U.S. PATENT DOCUMENTS

| | | | | |
|---|---|---|---|---|
| 10,480,709 | B1 * | 11/2019 | Chumakov | F16M 11/08 |
| 10,810,826 | B2 * | 10/2020 | Schoonmaker | G07F 17/3211 |
| 2003/0001056 | A1 * | 1/2003 | Ihalainen | F16M 13/02<br>248/276.1 |
| 2004/0099779 | A1 * | 5/2004 | Mileos | A47B 21/0314<br>248/281.11 |
| 2008/0093522 | A1 * | 4/2008 | Oddsen | F16M 11/38<br>248/276.1 |
| 2012/0138754 | A1 * | 6/2012 | Lim | F16M 11/24<br>248/65 |
| 2018/0112860 | A1 * | 4/2018 | Hung | F16M 11/06 |
| 2023/0296202 | A1 * | 9/2023 | Feng | F16M 11/24<br>248/284.1 |
| 2024/0093830 | A1 * | 3/2024 | Barros | F16M 11/2092 |

FOREIGN PATENT DOCUMENTS

| | | | | |
|---|---|---|---|---|
| CN | 111706761 | A | 9/2020 | |
| DE | 102021121258 | B3 * | 8/2022 | G02B 21/0012 |
| EP | 0335207 | B1 * | 2/1994 | F16M 11/24 |
| WO | 2019001132 | A | 1/2019 | |

* cited by examiner

MONITOR SUPPORTING STRUCTURE BASED ON DUAL FOUR-BAR LINKAGE BALANCE CONTROL

CROSS-REFERENCE TO RELATED APPLICATIONS

This application claims priority to Chinese Patent Application No. 202511261280.6, filed on Sep. 5, 2025, which is hereby incorporated by reference in its entirety.

TECHNICAL FIELD

The present invention relates to the technical field of monitor supporting, and specifically relates to a monitor supporting structure based on dual four-bar linkage balance control.

BACKGROUND

With the widespread application of liquid crystal display monitors in offices, homes, e-sports and other scenarios, users have put forward higher requirements for mounting flexibility and adjustment convenience of monitors, as well as desktop neatness. In order to realize multi-angle adjustment of a monitor (such as tilting, lifting and lowering, and rotation), a four-bar linkage supporting structure is generally used in the prior art as a core transmission mechanism of a monitor supporting assembly—the structure usually comprises a monitor bearing assembly, a support adjustment assembly, and a plane fixing assembly, where angular rotation is realized by connection of a rotating shaft, and a tension spring is used to counteract a torque generated by the gravity of the monitor and maintain a stable state after adjustment, which has become a mainstream monitor supporting solution.

When adjustment is performed by the existing support adjustment assembly, in order to enable a display screen to be suspended at any upper, middle or lower position, it is designed to use a parallelogram principle to maintain an unchanged angle and achieve force balance. During the change of the center of gravity of the screen from top to bottom or from bottom to top, a spring is compressed or released according to a characteristic of a parallelogram, namely, the principle that when the lengths of four edges remain unchanged, changes in angles between adjacent edges cause diagonals to be longer or shorter, thereby providing a supporting force required for the change of the center of gravity.

A downward torque generated by the weight of the screen is MT=G(LA or LB or LC), wherein LB is a torque moment arm in a horizontal state, and LA and LA are torque moment arms located on two sides of LB. During rotation along a hinge point of the moment arms, the state of changing from the moment arm LA to the moment arm LB to the moment arm LC is changing from small to large and then from large to small (as shown in FIG. 1 of the specification). Therefore, when the weight remains unchanged, the torque generated by gravity changes from small to large and then from large to small. However, the characteristic of the parallelogram causes the spring to be continuously compressed during downward rotation, and therefore the force continuously increases to support the screen.

It can be seen from the above that the downward torque generated by the change of the center of gravity of the screen changes from small to large and then from large to small. However, a tension provided by the spring changes from small to large and then further increases. Therefore, a single parallelogram cannot completely balance the gravity of the screen. In current industry designs, a mismatch between the tension of the spring and the torque generated by the change of the center of gravity is balanced by adding friction to a rotation point.

The use of a friction-based adjustment solution (for example, generating resistance by tightly pressing a friction piece by a bolt) requires adjusting a certain amount of friction in advance during product production, so as to balance a difference between the gravity of the monitor and the tension spring.

However, the approach has obvious limitations: when a user adjusts the monitor after placing the monitor on the monitor bearing assembly, due to the existence of preset friction, upward and downward operation forces of the user are relatively large, and the excessively large preset friction is prone to attenuation after long-term frictional use.

SUMMARY

In view of the above situation, in order to overcome the defects in the prior art, a purpose of the present invention is to provide a monitor supporting structure based on dual four-bar linkage balance control, which effectively solves the problem that in an existing monitor supporting structure, a torque generated by a monitor and a tension generated by a spring are inconvenient to balance.

The technical solution solved by the present invention is a monitor supporting structure based on dual four-bar linkage balance control, comprising a monitor bearing assembly, a support adjustment assembly, and a plane fixing assembly, the monitor bearing assembly being connected to the support adjustment assembly via a first rotating shaft and being used for fixing a monitor, and the support adjustment assembly being mounted on the plane fixing assembly via a second rotating shaft, wherein the support adjustment assembly comprises a connecting portion, a tension portion, and an auxiliary portion, the connecting portion comprises a first connecting end and a second connecting end, the tension portion is arranged between the first connecting end and the second connecting end and is used for balancing a torque generated by the gravity of the monitor, and the auxiliary portion is arranged on one side of the second connecting end, acts on the tension portion and is used for adjusting a tension generated by the tension portion; and the auxiliary portion comprises a first link, a second link, and a movable block, the first link and the second link are arranged in parallel, the same ends of the first link and the second link are both hinged to the second connecting end, the sides of the first link and the second link that are away from the second connecting end are hinged via a connecting block, and the movable block is hinged to the connecting block and is in contact with the side of the tension portion that is close to the second connecting end, so as to provide support for the tension portion.

Preferably, the tension portion comprises a bottom rod, a hinge block, an auxiliary block, and a tension spring, two ends of the bottom rod are respectively hinged to the first connecting end or the second connecting end, a hinge point between the bottom rod and the second connecting end is lower than a hinge point between the first link and the second connecting end, the hinge block is hinged to the first connecting end, a hinge point between the hinge block and the first connecting end is higher than a hinge point between the bottom rod and the first connecting end, the auxiliary block is slidably connected relative to the bottom rod, one end of the auxiliary block is in contact with the movable block, and the tension spring is arranged between the other end of the auxiliary block and the hinge block.

Preferably, the auxiliary block is provided with an accommodating slot for accommodating the movable block, and an outer edge surface of the movable block is in contact with a bottom wall of the accommodating slot.

Preferably, the tension portion further comprises a housing and an adjustment component, the housing is arranged on an outer side of the tension spring and is used for guiding the tension spring, the adjustment component comprises a threaded rod, an adjustment block, and a feeding mechanism, the adjustment block is inserted into the housing, is slidably connected to the housing and is used for adjusting the tension spring, the threaded rod is threadedly connected to the adjustment block and is used for driving the adjustment block to move along a length direction of the housing, and the feeding mechanism is connected to the threaded rod and is used for driving the threaded rod to rotate.

Preferably, the support adjustment assembly further comprises an outer shell and an adjustment indicating portion, the outer shell is arranged on an outer side of the housing and is rotatably connected to the first connecting end, the outer shell is provided with an auxiliary hole for accommodating the adjustment indicating portion, the adjustment indicating portion comprises an indicating pointer fixedly connected to the adjustment block and an indicating plate mounted in the auxiliary hole, and the indicating plate is provided with scale marks used in conjunction with the indicating pointer.

Preferably, the support adjustment assembly further comprises a cable storage portion, the cable storage portion is used for accommodating cables, the cable storage portion comprises a shielding cover and cable baffles, and there are two cable baffles, which are symmetrically mounted on two sides of the housing.

Preferably, the cable baffles comprise supporting plates, first bearing plates and second bearing plates, the first bearing plates and the second bearing plates are arranged in parallel in a stepped manner and are perpendicular to the supporting plates, and the supporting plates are detachably connected to the housing via a first snap-fit structure.

Preferably, the first snap-fit structure comprises limiting blocks, snap-fit hooks, and blocking blocks, there are a plurality of limiting blocks, which are evenly fixed to the housing along the length direction of the housing and can be inserted into the snap-fit hooks, the snap-fit hooks are arranged on the supporting plates and correspond to the limiting blocks on a one-to-one basis, the blocking blocks are fixed to the housing and are located on the sides of the outermost limiting blocks that are away from openings of the snap-fit hooks, the sides of the blocking blocks that are away from the openings of the snap-fit hooks are acute-angled inclined surfaces, the first snap-fit structure further comprises guide plates, each guide plate is arranged on one side of each of the limiting blocks and is used for guiding the movement of the snap-fit hooks.

Preferably, the shielding cover is U-shaped, a U-shaped opening of the shielding cover is used for accommodating the cable baffles and is detachably connected to the supporting plates via a second snap-fit structure, the second snap-fit structure comprises limiting frames and limiting elastic pieces, the limiting frames are arranged on the supporting plates and are used for accommodating the limiting elastic pieces, the limiting elastic pieces are arranged on the shielding cover and are inserted into the U-shaped opening of the shielding cover.

Preferably, the shielding cover is provided with clearance slots corresponding to the limiting elastic pieces, the limiting elastic pieces can be inserted into the clearance slots to form corresponding clearances, one side of each of the limiting frames is provided with an inclined plate arranged in an inclined manner, lower ends of the limiting elastic pieces can be in contact with the inclined plates, the sides of the limiting frames that are close to the inclined plates are provided with auxiliary plates, and the sides of the auxiliary plates that are away from the inclined plates are acute-angled inclined surfaces.

The present invention has the following beneficial effects.

In the present invention, another auxiliary four-bar linkage structure is added on the basis of an existing four-bar linkage support, and a tension generated by an existing four-bar linkage structure is balanced by the added four-bar linkage structure. Compared with an existing manner of balancing the tension generated by the four-bar linkage structure by adding friction, there is no need for a user to manually adjust the friction, and automatic adaptation to a swinging angle of the support adjustment assembly can be realized.

In the present invention, the auxiliary four-bar linkage structure formed by the first link, the second link, the connecting block and the second connecting end is used, which can assist in increasing the tension generated by the tension spring when the support adjustment assembly swings downward to the horizontal state, and can assist in reducing the tension of the tension spring when the support adjustment assembly continues to swing downward from the horizontal state, which corresponds to a torque curve of the monitor that is generated as the support adjustment assembly swings, thereby improving the usage experience of the user.

In the present invention, the adjustment component is used, which can drive, by the feeding mechanism, the threaded rod to rotate. During the rotation of the threaded rod, an initial length of the tension spring is adjusted by using the adjustment block slidably connected to the housing. Moreover, the indicating pointer is used in conjunction with the indicating plate, such that the user observes the state of the tension spring. Therefore, monitors of different weights can be adapted to different states of the tension spring.

In the present invention, the cable storage structure is further used, which can store the cables of the monitor, and the first bearing plates and the second bearing plates are arranged in a stepped manner, such that the cables of the monitor can be better wound and stored.

Figure 1:
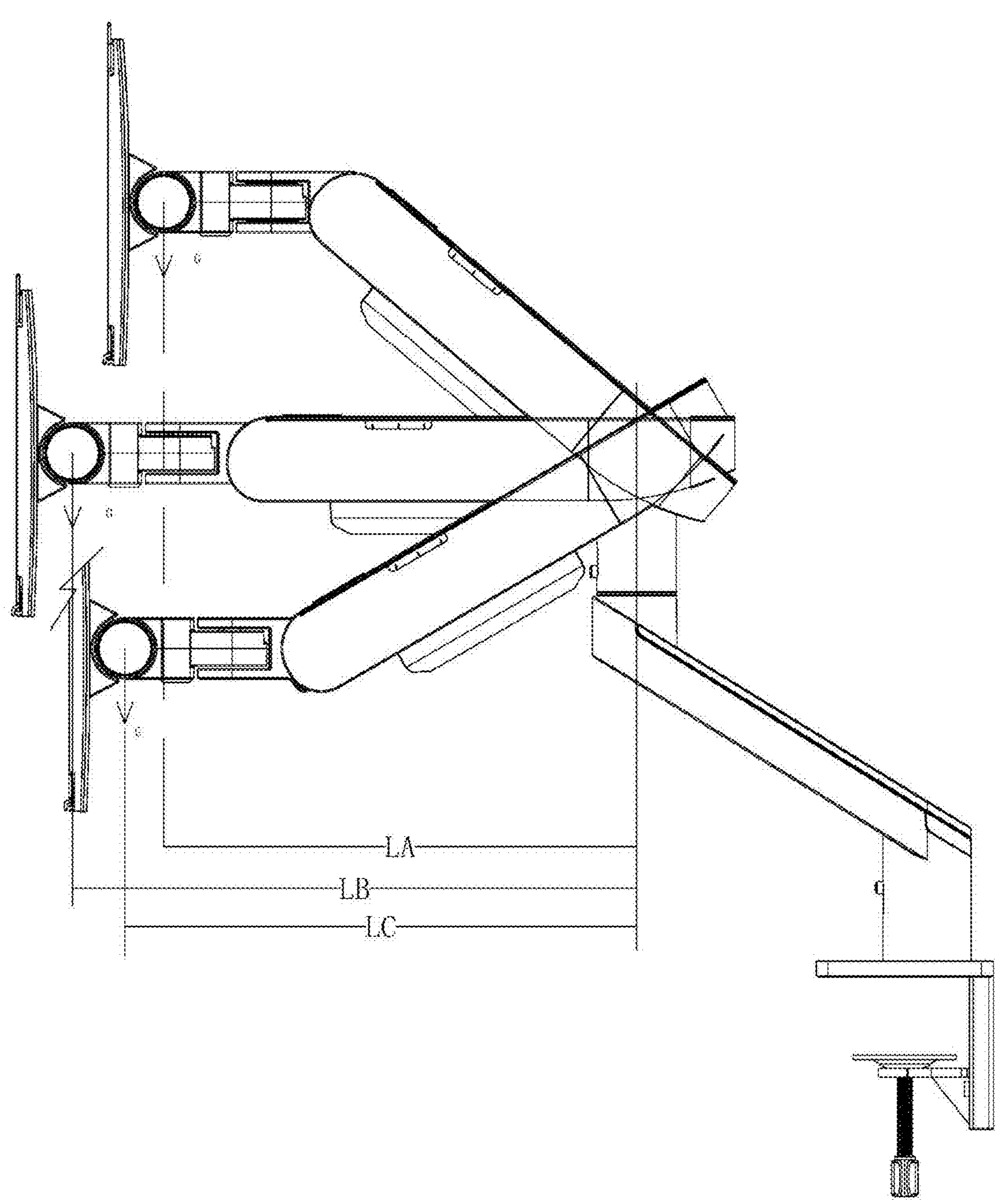
FIG. 1 is a schematic diagram of the swing of a moment arm of an existing monitor supporting structure.

In the drawings, 1—first rotating shaft; 2—second rotating shaft; 3—first connecting end; 4—second connecting end; 5—first link; 6—second link; 7—movable block; 8—connecting block; 9—bottom rod; 10—hinge block; 11—auxiliary block; 12—tension spring; 13—accommodating slot; 14—housing; 15—threaded rod; 16—adjustment block; 17—feeding mechanism; 18—outer shell; 19—auxiliary hole; 20—indicating pointer; 21—indicating plate; 22—scale mark; 23—shielding cover; 24—supporting plate; 25—first bearing plate; 26—second bearing plate; 27—limiting block; 28—snap-fit hook; 29—blocking block; 30—guide plate; 31—limiting frame; 32—limiting elastic piece; 33—clearance slot; 34—inclined plate; 35—auxiliary plate; 36—monitor bearing assembly; 37—plane fixing assembly; and 38—connecting arm.

DESCRIPTION OF EMBODIMENTS

Specific embodiments of the present invention are further described in detail below in conjunction with the drawings.

Figure 2:
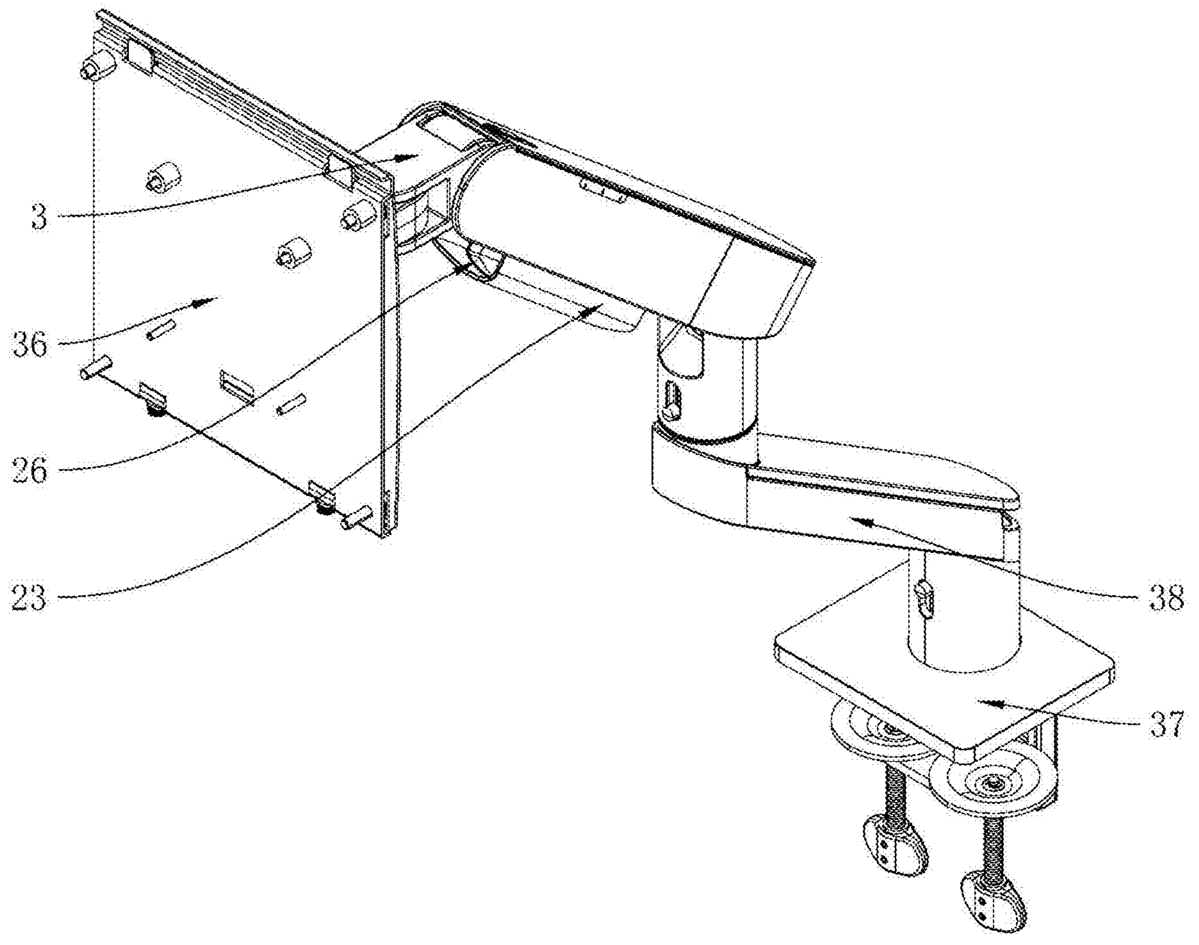
FIG. 2 is a three-dimensional structural schematic diagram of the present invention.
Figure 3:
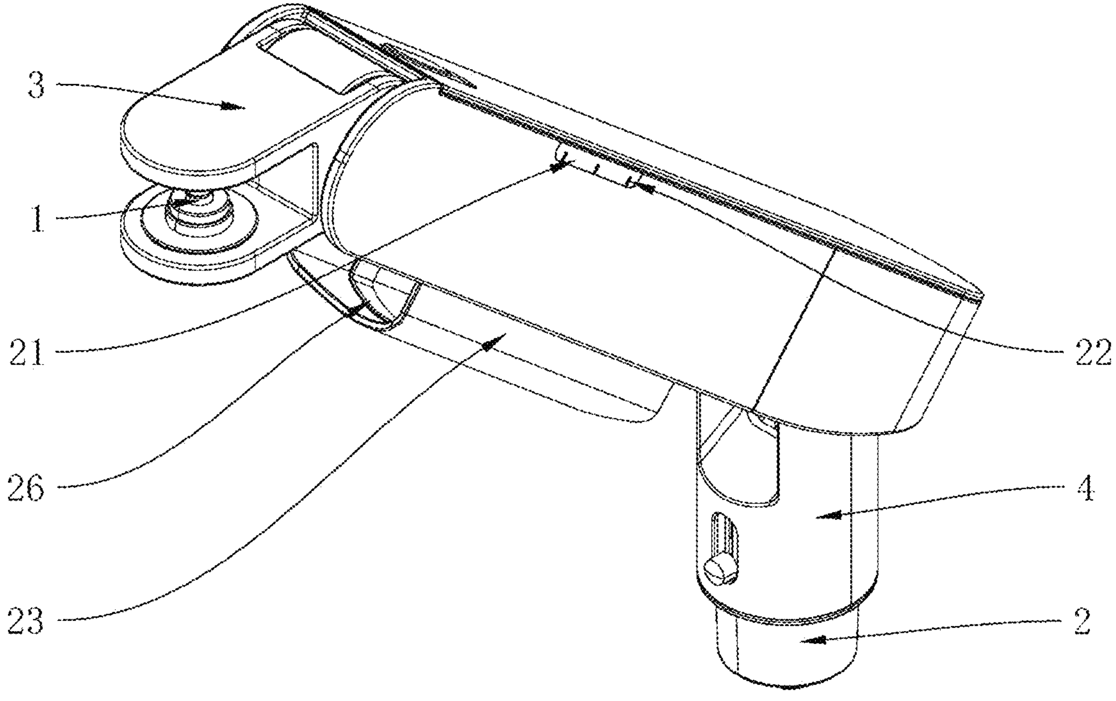
FIG. 3 is a three-dimensional structural schematic diagram of a support adjustment assembly in the present invention.
Figure 4:
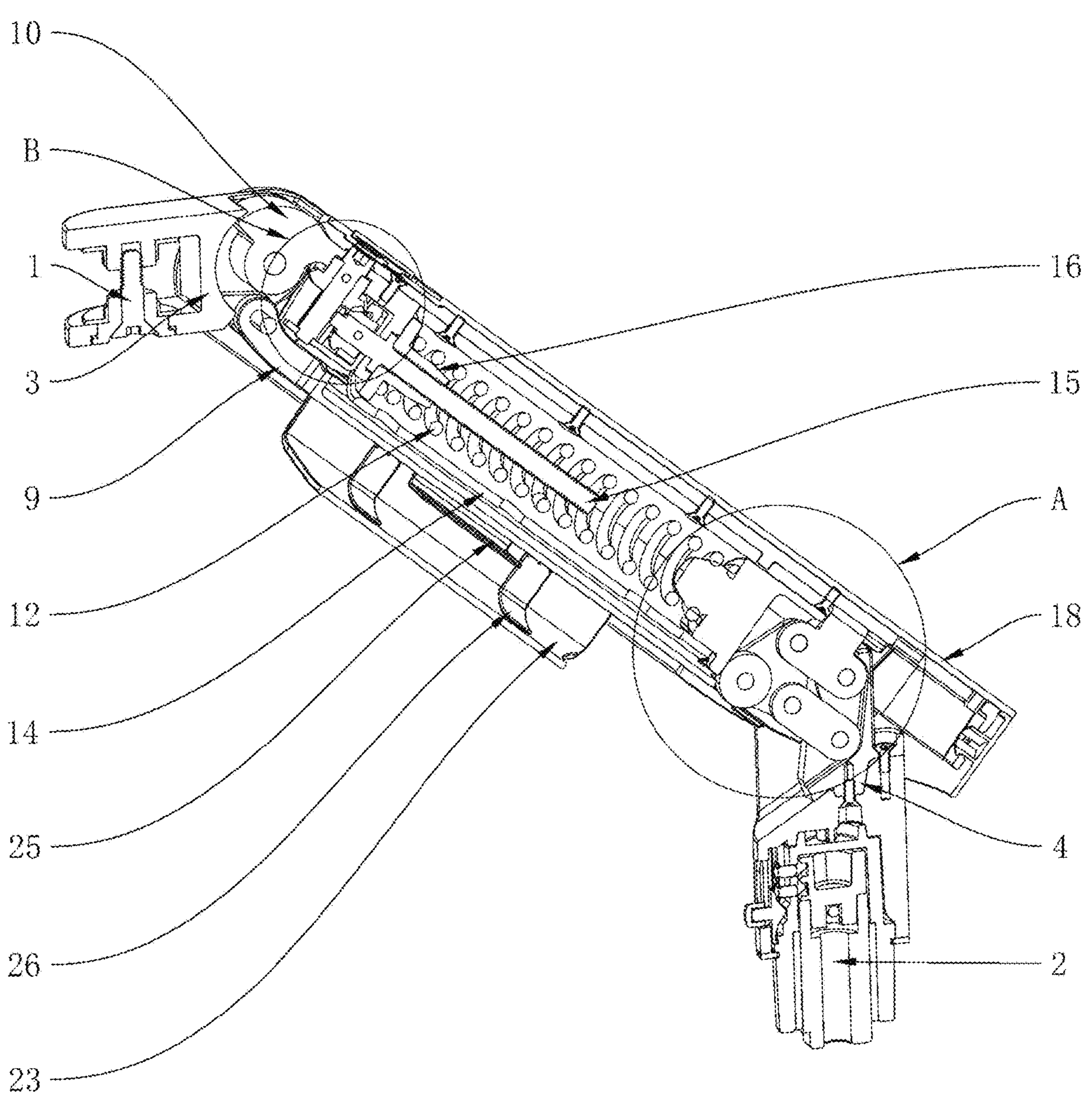
FIG. 4 is a sectional front-view structural schematic diagram of the support adjustment assembly in the present invention.
Figure 5:
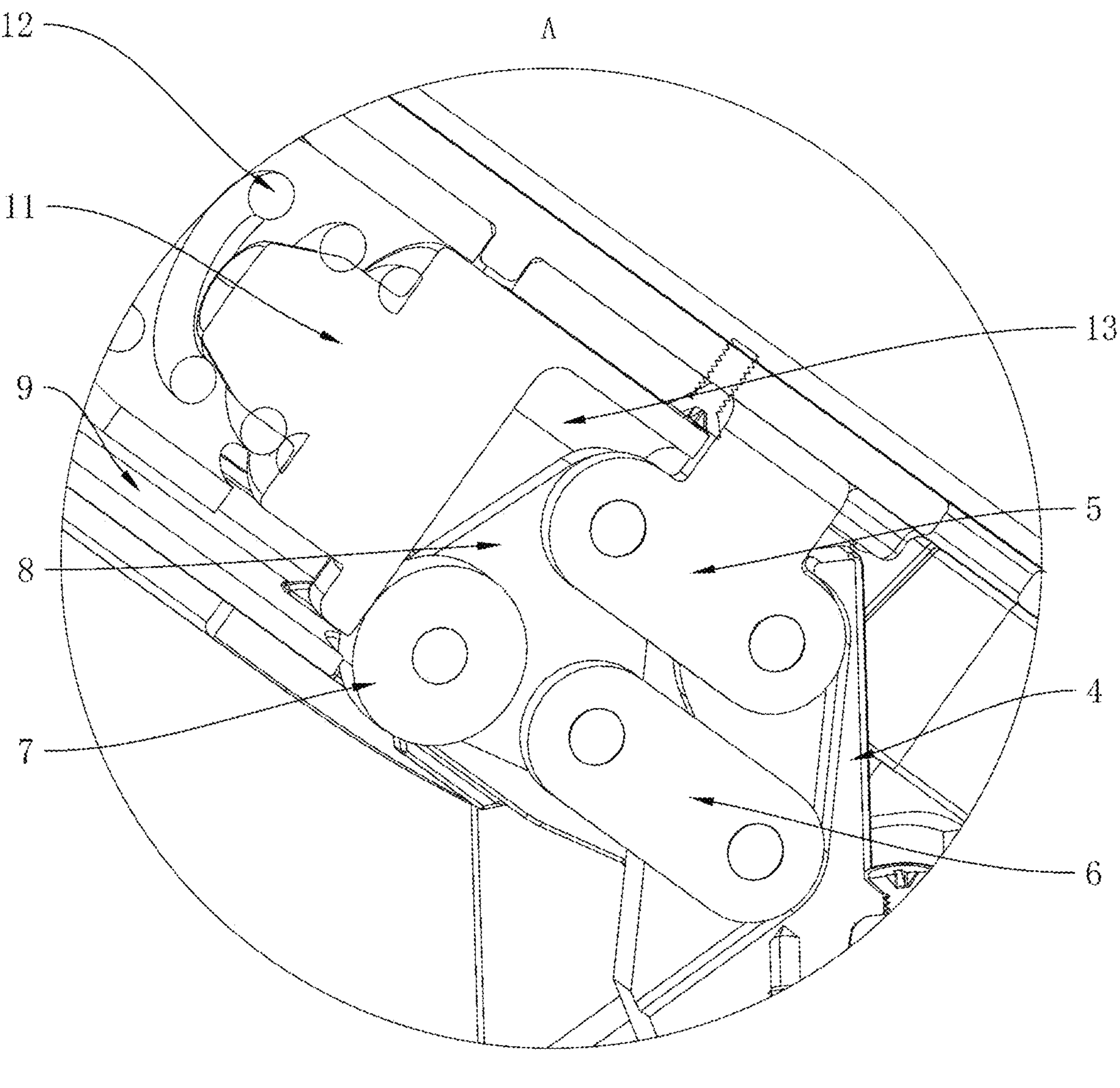
FIG. 5 is an enlarged view of part A in FIG. 4 of the present invention.
Figure 6:
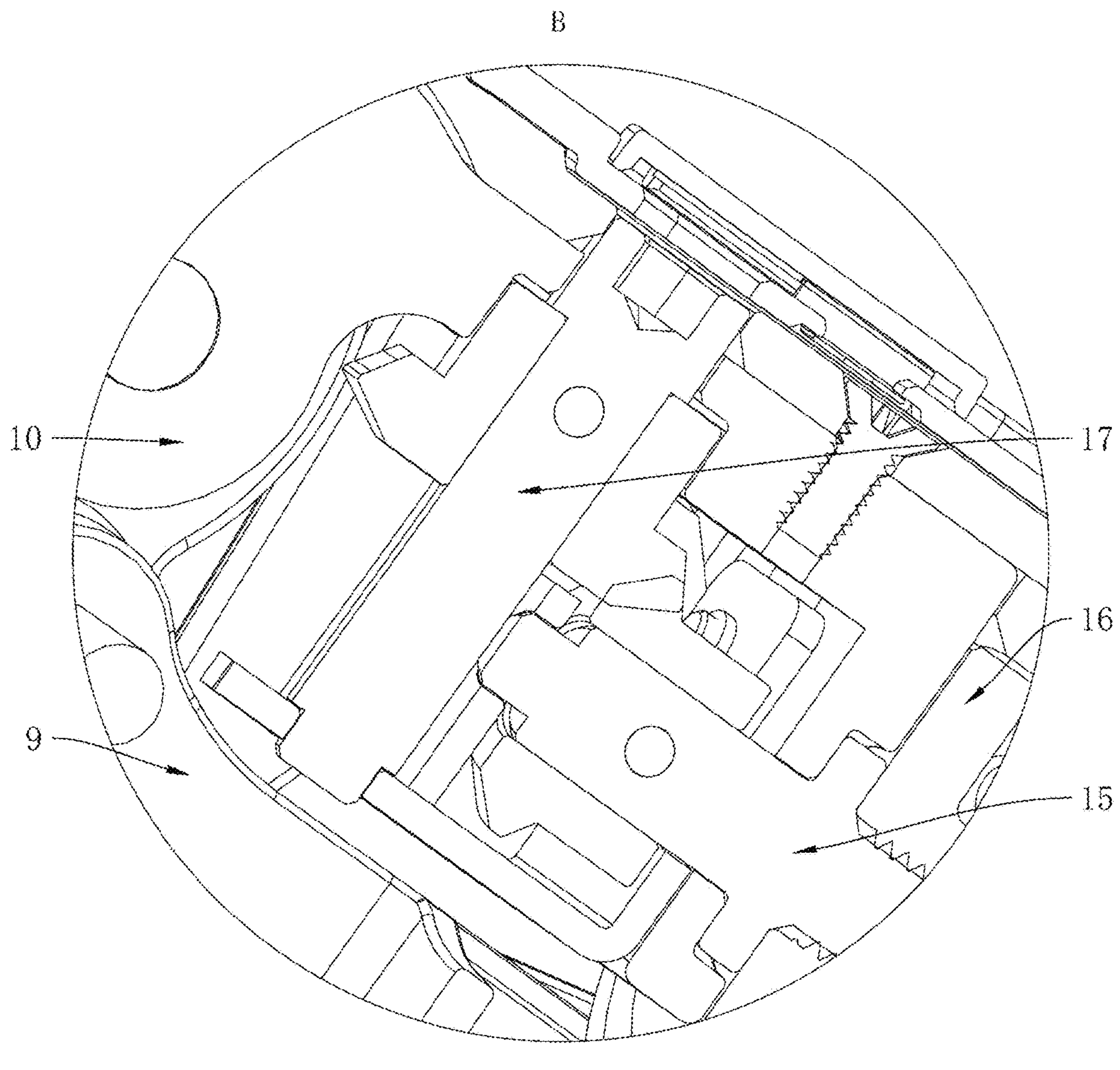
FIG. 6 is an enlarged view of part B in FIG. 4 of the present invention.
Figure 7:
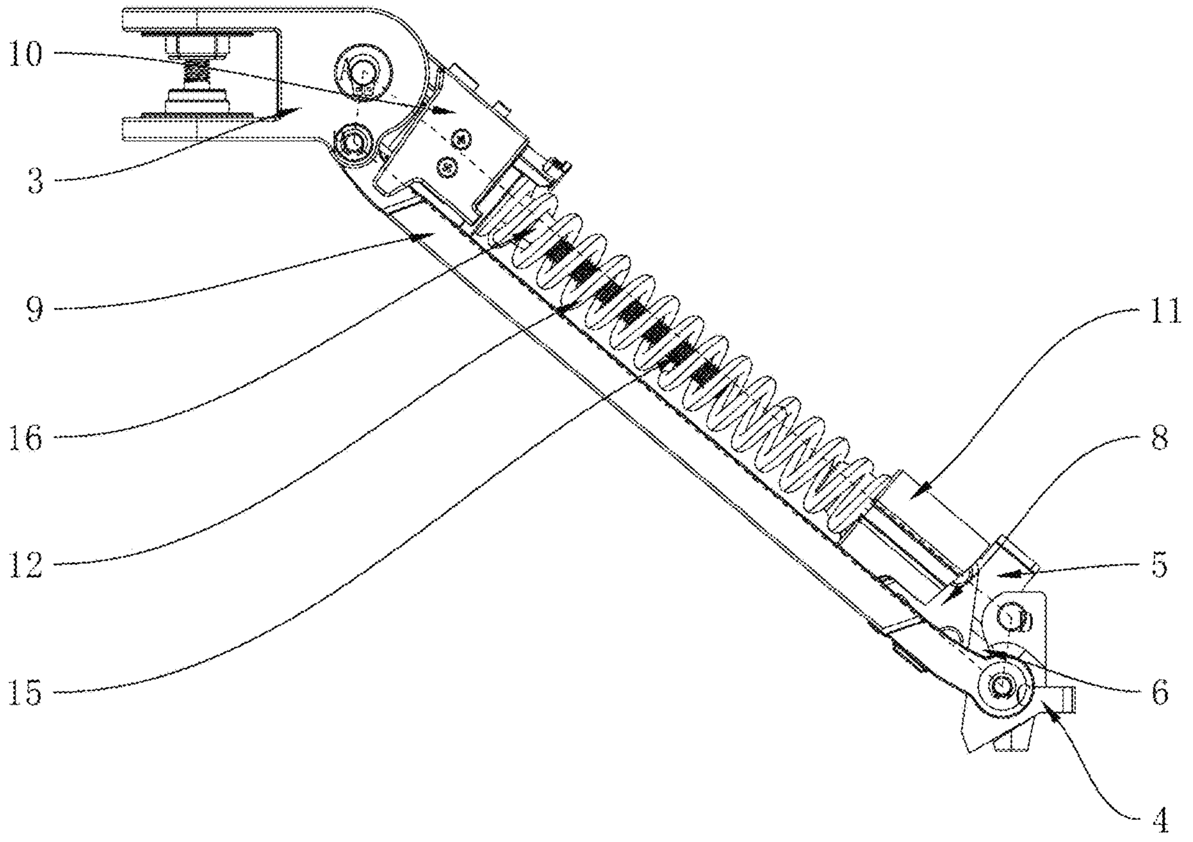
FIG. 7 is a front-view structural schematic diagram of the support adjustment assembly of the present invention with an outer shell and a housing removed.
Figure 8:
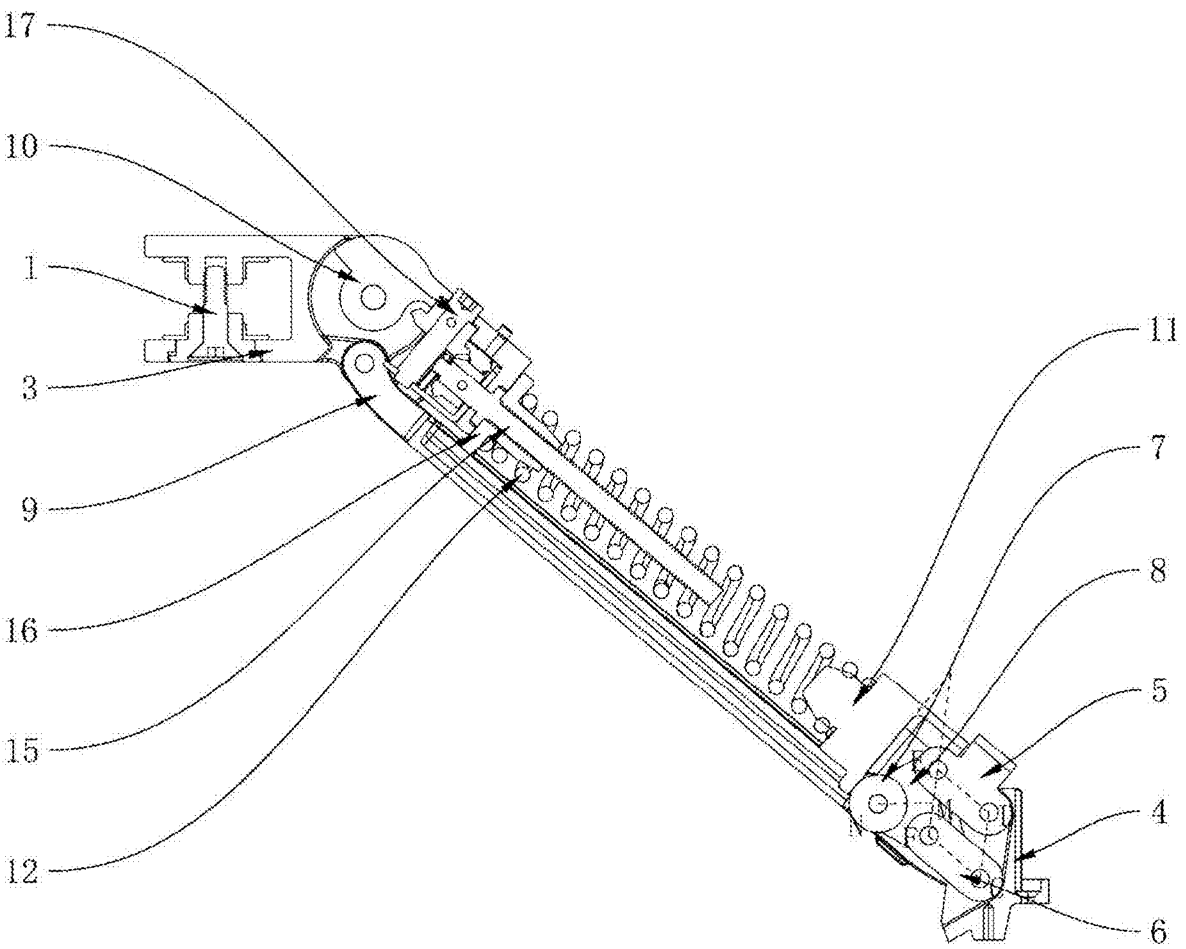
FIG. 8 is a sectional front-view structural schematic diagram of the support adjustment assembly of the present invention with the outer shell and the housing removed.
Figure 9:
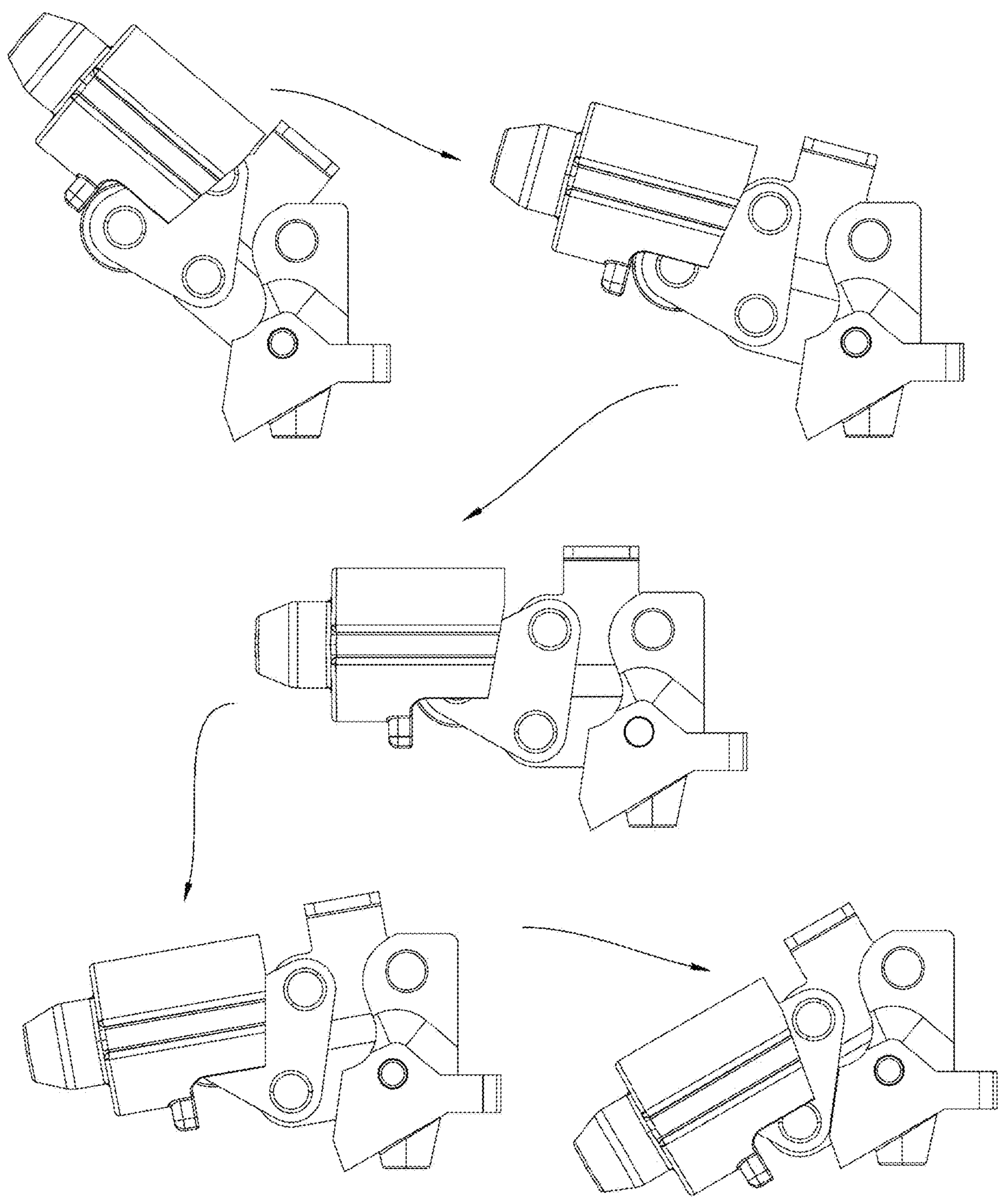
FIG. 9 is a schematic diagram of angle changes of an auxiliary portion in the present invention.
Figure 10:
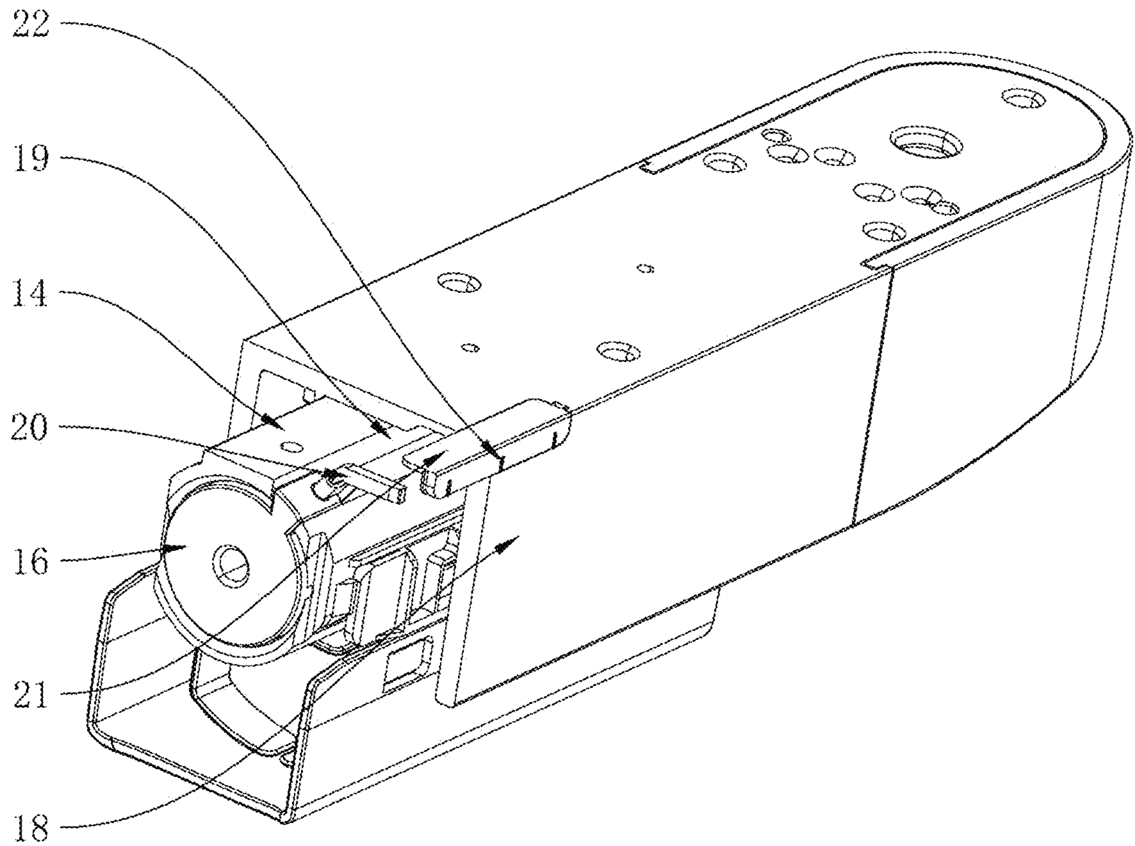
FIG. 10 is a three-dimensional structural schematic diagram of the housing after sectioning in the present invention.
Figure 11:
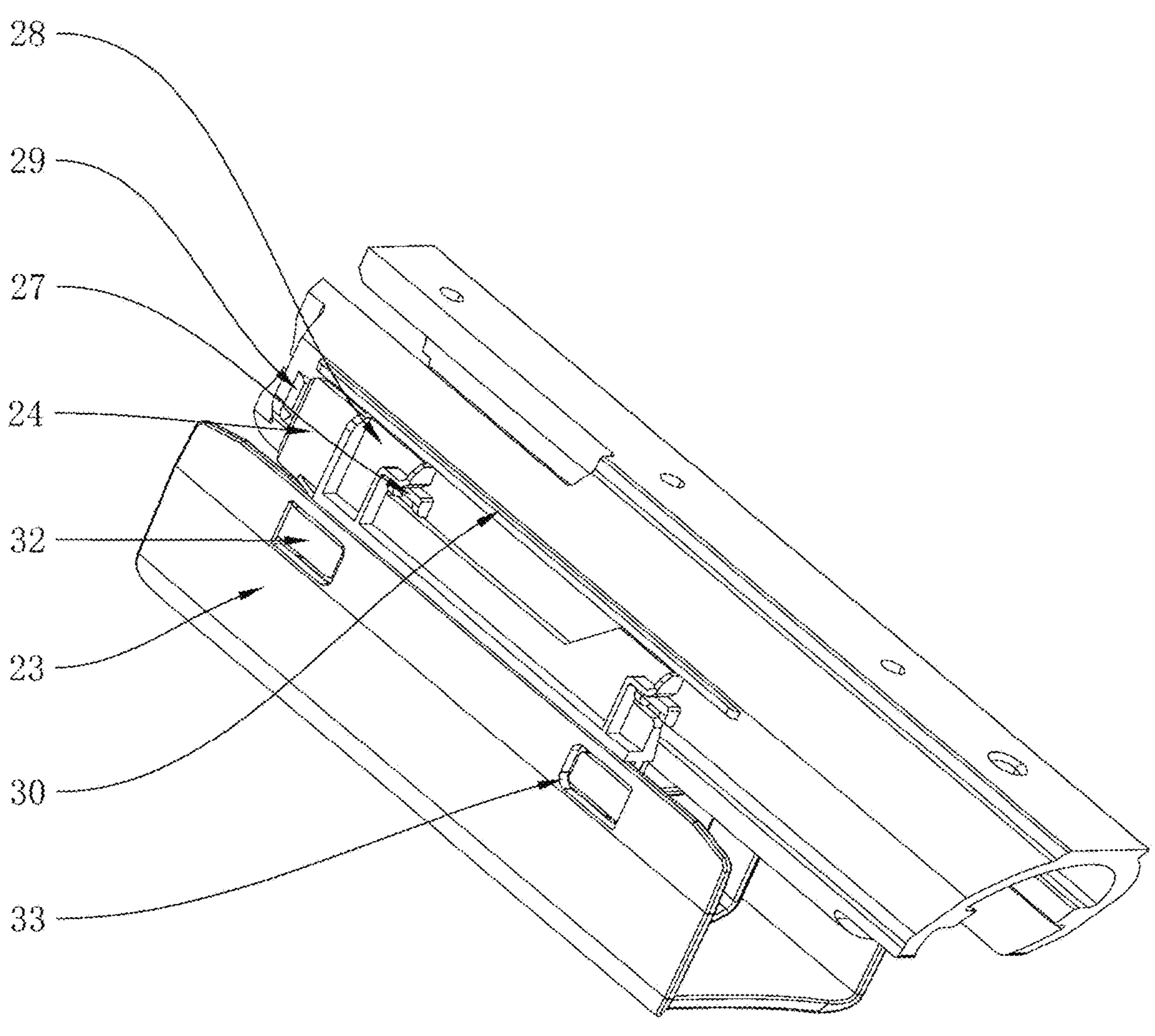
FIG. 11 is a three-dimensional structural schematic diagram of a cable storage portion in the present invention.
Figure 12:
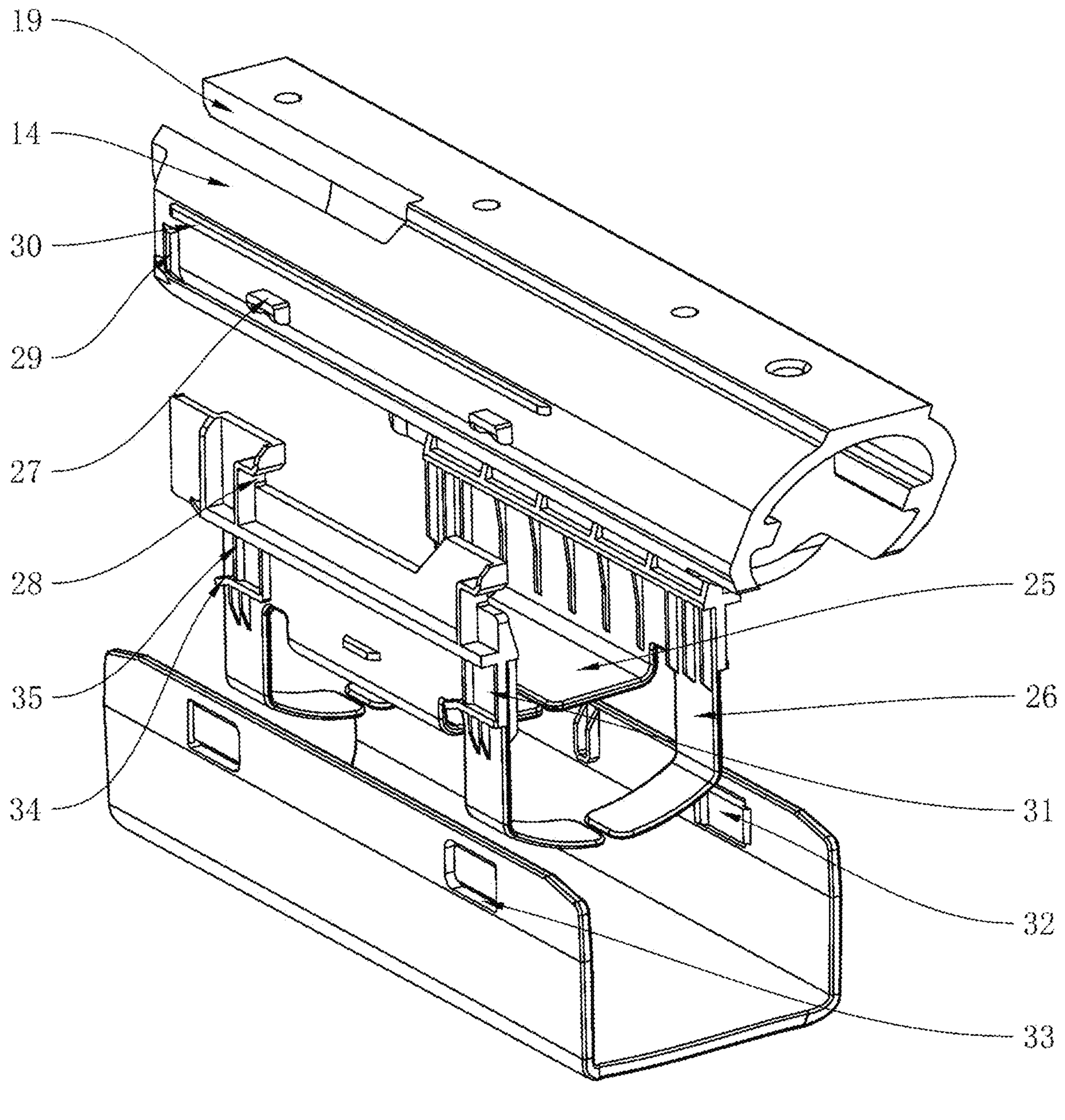
FIG. 12 is an exploded structural schematic diagram of the cable storage portion in the present invention.
Figure 13:
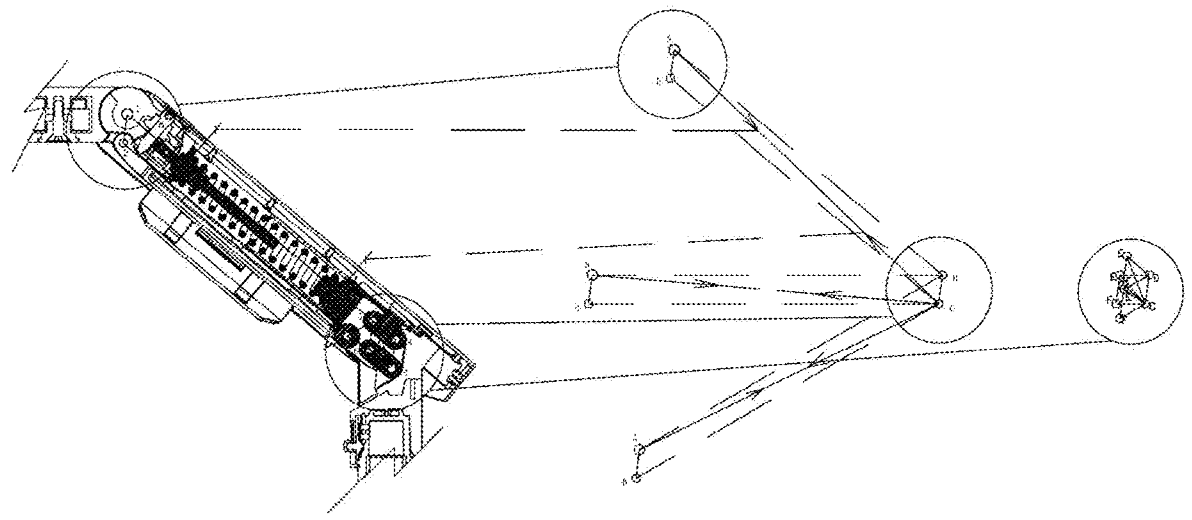
FIG. 13 is a structural schematic diagram of the present invention after an auxiliary parallelogram is added.
Figure 14:
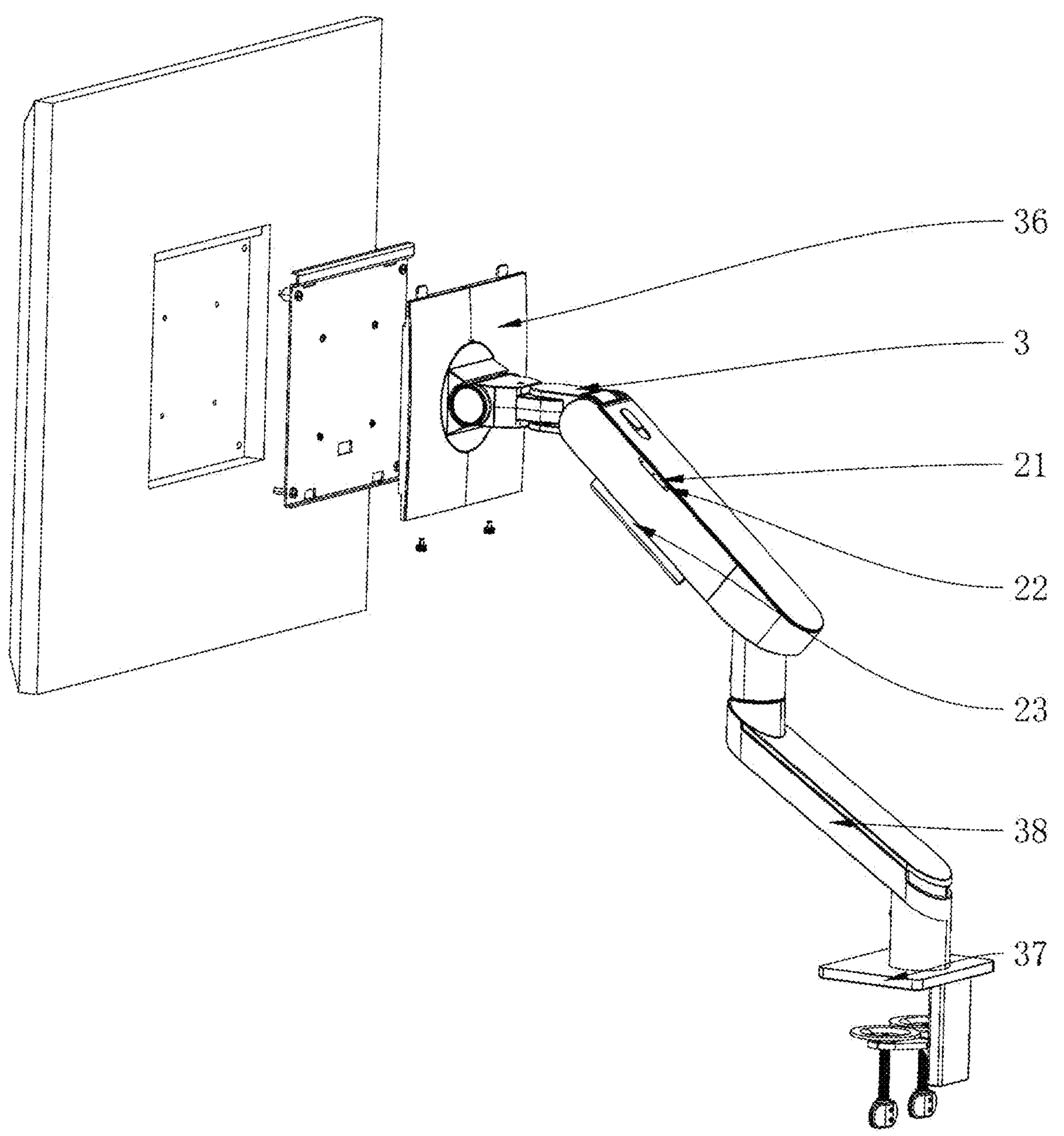
FIG. 14 is an exploded structural schematic diagram of a monitor mounted on a monitor bearing assembly in the present invention.

Referring to FIGS. 1-14 of the specification, a monitor supporting structure based on dual four-bar linkage balance control is sequentially provided with a monitor bearing assembly 36, a support adjustment assembly, and a plane fixing assembly 37 from a monitor to a fixing plane, wherein the monitor is mounted on the monitor bearing assembly 36, and the monitor can be fixedly mounted on the monitor bearing assembly 36 by a positioning column on the monitor bearing assembly 36 and limiting bolts corresponding to limiting holes on a back side of a monitor panel.

The support adjustment assembly is connected to the monitor bearing assembly 36 by a first rotating shaft 1. Under the action of the first rotating shaft 1, the monitor bearing assembly 36 can rotate around the first rotating shaft 1, such that the monitor on the monitor bearing assembly 36 can provide different angles.

The support adjustment assembly comprises a connecting portion, a tension portion, and an auxiliary portion, wherein the connecting portion comprises a first connecting end 3 and a second connecting end 4, the first connecting end 3 is connected to the monitor bearing assembly 36 via the first rotating shaft 1, and the tension portion is arranged between the first connecting end 3 and the second connecting end 4 and is used for balancing a torque generated by a product of the gravity of the monitor and a moment arm. Moreover, the auxiliary portion is arranged between the side of the tension portion that is close to the second connecting end 4 and the second connecting end 4, and a tensioning force generated by the tension portion is adjusted by the auxiliary portion.

The tension portion comprises a bottom rod 9, a hinge block 10, an auxiliary block 11, and a tension spring 12. One end of the bottom rod 9 is hinged to the first connecting end 3, and the other end of the bottom rod 9 is hinged to the second connecting end 4. The hinge block 10 is arranged above a position at which the bottom rod 9 is hinged to the first connecting end 3, and is hingedly connected to the first connecting end 3.

The auxiliary block 11 is hinged to the second connecting end 4 via the auxiliary portion. Moreover, there are two hinge points between the auxiliary portion and the second connecting end 4, wherein one of the hinge points coincides with a hinge point between the bottom rod 9 and the second connecting end 4, and the other hinge point is located above the hinge point between the bottom rod 9 and the second connecting end 4.

A hinge point between the hinge block 10 and the first connecting end 3 is set to be a point A, a hinge point between the bottom rod 9 and the first connecting end 3 is set to be a point B, the hinge point between the bottom rod 9 and the second connecting end 4 is set to be a point C, and the other hinge point between the auxiliary portion and the second connecting end 4 is set to be a point D, where AB and CD are parallel and equal, and a quadrilateral formed by connecting the four points A, B, C and D is a parallelogram.

When an edge AD swings around the point D, an angle ADC gradually decreases. Under the theorem of a cosine function, when an angle is less than 180 degrees and greater than 0 degrees, a value of the cosine function will gradually increase as the angle decreases. Under the condition that the lengths of adjacent edges remain unchanged, a diagonal AC gradually decreases. Therefore, when the edge AD swings around the point D, pressure received by the tension spring 12 gradually increases, and a reaction force generated by the tension spring 12 also gradually increases.

The auxiliary portion comprises a first link 5, a second link 6, and a movable block 7. The first link 5 and the second link 6 are arranged in parallel, and the same ends of the first link 5 and the second link 6 are both hinged to the second connecting end 4. A hinge point of the second link 6 coincides with the hinge point of the bottom rod 9, and a hinge point of the first link 5 is the point D. The sides of the first link 5 and the second link 6 that are away from the second connecting end 4 are hinged via a connecting block 8. Moreover, the first link 5 is always parallel to an outer shell 18 of the support adjustment assembly. Under the joint action of the hinge block 10, the first link 5, the second link 6 and the second connecting end 4, another corresponding parallelogram structure is formed. When the support adjustment assembly swings downward, the parallelogram formed by the first link 5, the second link 6 and the hinge block 10 synchronously swings downward around the second connecting end 4.

A hinge point between the first link 5 and the connecting block 8 is set to be a point E, and a hinge point between the second link 6 and the connecting block 8 is set to be a point F. During the swinging of a parallelogram CDEF, an angle formed between an extension line of an edge EF and an extension line of the surface of the auxiliary block 11 that is close to the second connecting end 4 gradually decreases from an acute angle to a parallel state. After the parallel state is reached, an angle between a reverse extension line of the edge EF and a reverse extension line of the surface of the auxiliary block 11 that is close to the second connecting end 4 increases from the parallel state to an acute angle state.

The connecting block 8 may be an equilateral triangle having the same length as the edge EF. The movable block 7, which is in contact with the surface of the auxiliary block 11 that is close to the second connecting end 4, is further rotatably connected to the connecting block 8. A hinge point between the movable block 7 and the connecting block 8 is set as N, and a midpoint of the line EF is set as M. Under a characteristic of the equilateral triangle, a line segment formed by NM is always perpendicular to EF. Therefore, during the swinging of the parallelogram CDEF, an angle between the line NM and the surface of the auxiliary block 11 that is close to the second connecting end 4 gradually increases from less than 90 degrees to greater than 90 degrees, wherein when the angle approaches 90 degrees, the support adjustment assembly is in a horizontal state, at which point the torque formed by the product of the weight of the monitor itself and the moment arm reaches the maximum.

The auxiliary block 11 is provided with an accommodating slot 13 for accommodating the movable block 7. The movable block 7 is inserted into the accommodating slot 13 and fits against an inner wall of the accommodating slot 13. Under the action of the accommodating slot 13, on one hand, the movable block 7 is limited and guided, and on the other hand, the auxiliary block 11 can also be caused to be always in contact with the movable block 7.

In order to adapt to products of varying weights, the tension portion is further provided with a housing 14 and an adjustment component. The housing 14 is arranged on an outer side of the tension spring 12 and is used for guiding the tension spring 12. The adjustment component comprises a threaded rod 15, an adjustment block 16, and a feeding mechanism 17. The adjustment block 16 is inserted into the housing 14, is slidably connected to the housing 14 and is used for adjusting the tension spring 12. The threaded rod 15 is threadedly connected to the adjustment block 16 and is used for driving the adjustment block 16 to move along a length direction of the housing 14. The feeding mechanism 17 is connected to the threaded rod 15 and is used for driving the threaded rod 15 to rotate. A pair of bevel gears, which are arranged perpendicular to each other and mesh with each other, may be selected as the feeding mechanism 17, where the rotation of one of the bevel gears can drive the other bevel gear to rotate. Alternatively, a worm gear and a worm, which are arranged perpendicular to each other, may also be selected, where the rotation of the worm causes the worm gear to rotate. The advantage of selecting the worm gear and the worm is that reverse rotation does not occur, however, the worm gear and the worm have high working environment requirements. Moreover, under the action of the threaded connection between the threaded rod 15 and the adjustment block 16, a certain degree of self-locking is already achieved. Therefore, it is more suitable to select a pair of bevel gears.

In order to better observe a spring adjustment range, the support adjustment assembly further comprises the outer shell 18 and an adjustment indicating portion. The outer shell 18 is arranged on an outer side of the housing 14 and is rotatably connected to the first connecting end 3. The outer shell 18 is provided with an auxiliary hole 19 for accommodating the adjustment indicating portion. The adjustment indicating portion comprises an indicating pointer 20 fixedly connected to the adjustment block 16 and an indicating plate 21 mounted in the auxiliary hole 19. The indicating plate 21 is provided with scale marks 22 used in conjunction with the indicating pointer 20. When the threaded rod 15 is rotated to drive the adjustment block 16 to move, the indicating pointer 20 moves synchronously with the adjustment block 16. Moreover, the indicating plate 21 is made of a transparent material, and therefore the position of the indicating pointer 20 can be observed in real time from an outer side.

In order to store cables, the support adjustment assembly further comprises a cable storage portion. The cable storage portion is used for accommodating the cables. The cable storage portion comprises a shielding cover 23 and cable baffles. There are two cable baffles, which are symmetrically mounted on two sides of the housing 14.

The cable baffles comprise supporting plates 24, first bearing plates 25 and second bearing plates 26. The first bearing plates 25 and the second bearing plates 26 are arranged in parallel in a stepped manner and are perpendicular to the supporting plates 24. The supporting plates 24 are detachably connected to the housing 14 via a first snap-fit structure.

The first snap-fit structure comprises limiting blocks 27, snap-fit hooks 28, and blocking blocks 29. There are a plurality of limiting blocks 27, which are evenly fixed to the housing 14 along the length direction of the housing 14 and can be inserted into the snap-fit hooks 28. The snap-fit hooks 28 are arranged on the supporting plates 24 and correspond to the limiting blocks 27 on a one-to-one basis. The blocking blocks 29 are fixed to the housing 14 and are located on the sides of the outermost limiting blocks 27 that are away from openings of the snap-fit hooks 28. The sides of the blocking blocks 29 that are away from the openings of the snap-fit hooks 28 are acute-angled inclined surfaces. The first snap-fit structure further comprises guide plates 30. Each guide plate 30 is arranged on one side of each of the limiting blocks 27 and is used for guiding the movement of the snap-fit hooks 28.

The shielding cover 23 is U-shaped. A U-shaped opening of the shielding cover 23 is used for accommodating the cable baffles and is detachably connected to the supporting plates 24 via a second snap-fit structure. The second snap-fit structure comprises limiting frames 31 and limiting elastic pieces 32. The limiting frames 31 are arranged on the supporting plates 24 and are used for accommodating the limiting elastic pieces 32. The limiting elastic pieces 32 are arranged on the shielding cover 23 and are inserted into the U-shaped opening of the shielding cover 23.

The shielding cover 23 is provided with clearance slots 33 corresponding to the limiting elastic pieces 32. The limiting elastic pieces 32 can be inserted into the clearance slots 33 to form corresponding clearances. One side of each of the limiting frames 31 is provided with an inclined plate 34 arranged in an inclined manner. Lower ends of the limiting elastic pieces 32 can be in contact with the inclined plates 34. The sides of the limiting frames 31 that are close to the inclined plates 34 are provided with auxiliary plates 35. The sides of the auxiliary plates 35 that are away from the inclined plates 34 are acute-angled inclined surfaces.

In order to better connect the support adjustment assembly, a connecting arm 38 is further provided between the support adjustment assembly and the plane fixing assembly 37. By the connecting arm 38, on one hand, the monitor can be raised in height, and on the other hand, a space for the monitor to extend forward can further be provided.

The plane fixing assembly 37 is a relatively mature component in the prior art, and is generally fixed by snapping onto a plane and using pressure generated between bolts and a top plate. Since the specific technical improvement direction of the present application does not involve the plane fixing assembly 37, it will not be described again.

During use of the present invention, a user uses parts such as bolts to fix the monitor onto the monitor bearing assembly 36. When the monitor needs to be adjusted, the user swings the support adjustment assembly downward along the second connecting end 4. As the second connecting end 4 swings downward, a parallelogram formed by the bottom rod 9, the hinge block 10 and the second connecting end 4 compresses the tension spring 12. After the tension spring 12 is compressed, the reaction force generated by the tension spring 12 is used to balance a torque generated by the weight of the monitor on the basis of the support adjustment assembly. When the support adjustment assembly is lower than the horizontal state, the moment arm of the support adjustment assembly is reduced, the torque generated by the weight of the monitor is reduced, but the tension spring 12 is still in a contracted state, at which point the reaction force generated by the tension spring 12 is greater than the torque.

While the second connecting end 4 swings downward, and the parallelogram formed by the bottom rod 9, the hinge block 10 and the second connecting end 4 compresses the tension spring 12, a parallelogram formed by the first link 5, the second link 6, the connecting block 8 and the second connecting end 4 synchronously swings along the second connecting end 4, and at the same time, the movable block 7 hinged to the connecting block 8 compresses the auxiliary block 11, such that the reaction force generated by the tension spring 12 can be further increased.

When the support adjustment assembly is in the horizontal state, the movable block 7 compresses the auxiliary block 11 to a maximum value. As the support adjustment assembly continues to swing downward, the movable block 7 swings upward to provide a certain clearance space for the auxiliary block 11, such that the tension generated by the tension spring 12 can be reduced, thereby reducing resistance encountered by the user when the user presses the support adjustment assembly downward.

When a monitor of a different weight needs to be replaced, the user uses a tool to rotate the bevel gears, and the rotation of the bevel gears drives the rotation of the threaded rod 15. Since the threaded rod 15 is threadedly connected to the adjustment block 16, the threaded rod 15 can drive the adjustment block 16 to move. As the adjustment block 16 moves, when the monitor is not suspended, the length of the tension spring 12 can be compressed or released by the adjustment block 16, and at the same time, the indicating plate 21 can display the position of the indicating pointer 20, such that the user identifies the state of the tension spring 12.

When the cables need to be stored after the monitor has been mounted, the user moves the shielding cover 23 to remove the shielding cover 23 from the supporting plates 24, and stores the cables under the action of the first bearing plates 25 and the second bearing plates 26. When the storage of the cables is completed, the user mounts the shielding cover 23 on the supporting plates 24, and at the same time, limits the shielding cover 23 under the action of the limiting elastic pieces 32 and the limiting frames 31.

In the present invention, another auxiliary four-bar linkage structure is added on the basis of an existing four-bar linkage support, and a tension generated by an existing four-bar linkage structure is balanced by the added four-bar linkage structure. Compared with an existing manner of balancing the tension generated by the four-bar linkage structure by adding friction, there is no need to add additional friction to balance a difference between a supporting force of a four-bar linkage compression spring and a moment of the center of gravity of the monitor, and automatic adaptation to a swinging angle of the support adjustment assembly can be realized.

In the present invention, the auxiliary four-bar linkage structure formed by the first link 5, the second link 6, the connecting block 8 and the second connecting end 4 is used, which can assist in increasing the tension generated by the tension spring 12 when the support adjustment assembly swings downward to the horizontal state, and can assist in reducing the tension of the tension spring 12 when the support adjustment assembly continues to swing downward from the horizontal state, which corresponds to a torque curve of the monitor that is generated as the support adjustment assembly swings, thereby improving the usage experience of the user.

In the present invention, the adjustment component is used, which can drive, by the feeding mechanism 17, the threaded rod 15 to rotate. During the rotation of the threaded rod 15, an initial length of the tension spring 12 is adjusted by using the adjustment block 16 slidably connected to the housing 14. Moreover, the indicating pointer 20 is used in conjunction with the indicating plate 21, such that the user observes the state of the tension spring 12. Therefore, monitors of different weights can be adapted to different states of the tension spring 12.

In the present invention, the cable storage structure is further used, which can store the cables of the monitor, and the first bearing plates 25 and the second bearing plates 26 are arranged in a stepped manner, such that the cables of the monitor can be better wound and stored.

What is claimed is:

1. A monitor supporting structure based on dual four-bar linkage balance control, comprising: a monitor bearing assembly, a support adjustment assembly, and a plane fixing assembly, the monitor bearing assembly being connected to the support adjustment assembly via a first rotating shaft and being used for fixing a monitor, and the support adjustment assembly being mounted on the plane fixing assembly via a second rotating shaft, wherein the support adjustment assembly comprises a connecting portion, a tension portion, and an auxiliary portion, the connecting portion comprises a first connecting end and a second connecting end, the tension portion is arranged between the first connecting end and the second connecting end and is used for balancing a torque generated by a force of gravity on the monitor, and the auxiliary portion is arranged on one side of the second connecting end, acts on the tension portion and is used for adjusting a tension generated by the tension portion;

the auxiliary portion comprises a first link, a second link, and a movable block, the first link and the second link are arranged in parallel, ends of the first link and the second link are both hinged to the second connecting end, sides of the first link and the second link that are away from the second connecting end are hinged via a connecting block, and the movable block is hinged to the connecting block and is in contact with a side of the tension portion that is close to the second connecting end, so as to provide support for the tension portion;

the tension portion comprises a bottom rod, a hinge block, an auxiliary block, and a tension spring, one end of the bottom rod is hinged to the first connecting end, and another end of the bottom rod is hinged to the second connecting end, a hinge point between the bottom rod and the second connecting end is lower than a hinge point between the first link and the second connecting end, the hinge block is hinged to the first connecting end, a hinge point between the hinge block and the first connecting end is higher than a hinge point between the bottom rod and the first connecting end, the auxiliary block is slidably connected relative to the bottom rod, one end of the auxiliary block is in contact with the movable block, and the tension spring is arranged between the other end of the auxiliary block and the hinge block; and the tension portion further comprises a housing and an adjustment component, the housing is arranged on an outer side of the tension spring and is used for guiding the tension spring, the adjustment component comprises a threaded rod, an adjustment block, and a feeding mechanism, the adjustment block is inserted into the housing, is slidably connected to the housing and is used for adjusting the tension spring, the threaded rod is threadedly connected to the adjustment block and is used for driving the adjustment block to move along a length direction of the housing, and the feeding mechanism is connected to the threaded rod and is used for driving the threaded rod to rotate;

wherein the feeding mechanism is a pair of bevel gears that are arranged perpendicular to each other and mesh with each other or is a worm gear and a worm that are arranged perpendicular to each other.

2. The monitor supporting structure based on dual four-bar linkage balance control according to claim 1, wherein the auxiliary block is provided with an accommodating slot for accommodating the movable block, and an outer edge surface of the movable block is in contact with a bottom wall of the accommodating slot.

3. The monitor supporting structure based on dual four-bar linkage balance control according to claim 1, wherein the support adjustment assembly further comprises an outer shell and an adjustment indicating portion, the outer shell is arranged on an outer side of the housing and is rotatably connected to the first connecting end, the outer shell is provided with an auxiliary hole for accommodating the adjustment indicating portion, the adjustment indicating portion comprises an indicating pointer fixedly connected to the adjustment block and an indicating plate mounted in the auxiliary hole, and the indicating plate is provided with scale marks used in conjunction with the indicating pointer.

4. The monitor supporting structure based on dual four-bar linkage balance control according to claim 3, wherein the support adjustment assembly further comprises a cable storage portion, the cable storage portion is used for accommodating cables, the cable storage portion comprises a shielding cover and cable baffles, and there are two cable baffles, which are symmetrically mounted on two sides of the housing.

5. The monitor supporting structure based on dual four-bar linkage balance control according to claim 4, wherein the cable baffles comprise supporting plates, first bearing plates and second bearing plates, the first bearing plates and the second bearing plates are arranged in parallel in a stepped manner and are perpendicular to the supporting plates, and the supporting plates are detachably connected to the housing via a first snap-fit structure.

6. The monitor supporting structure based on dual four-bar linkage balance control according to claim 5, wherein the first snap-fit structure comprises limiting blocks, snap-fit hooks, and blocking blocks, there are a plurality of limiting blocks, which are evenly fixed to the housing along the length direction of the housing and can be inserted into the snap-fit hooks, the snap-fit hooks are arranged on the supporting plates and correspond to the limiting blocks on a one-to-one basis, the blocking blocks are fixed to the housing and are located on sides of the outermost limiting blocks that are away from openings of the snap-fit hooks, sides of the blocking blocks that are away from the openings of the snap-fit hooks are acute-angled inclined surfaces, the first snap-fit structure further comprises guide plates, and each guide plate is arranged on one side of each of the limiting blocks and is used for guiding the movement of the snap-fit hooks.

7. The monitor supporting structure based on dual four-bar linkage balance control according to claim 6, wherein the shielding cover is U-shaped, a U-shaped opening of the shielding cover is used for accommodating the cable baffles and is detachably connected to the supporting plates via a second snap-fit structure, the second snap-fit structure comprises limiting frames and limiting elastic pieces, the limiting frames are arranged on the supporting plates and are used for accommodating the limiting elastic pieces, the limiting elastic pieces are arranged on the shielding cover and are inserted into the U-shaped opening of the shielding cover.

8. The monitor supporting structure based on dual four-bar linkage balance control according to claim 7, wherein the shielding cover is provided with clearance slots corresponding to the limiting elastic pieces, the limiting elastic pieces are inserted into the clearance slots to form corresponding clearances, one side of each of the limiting frames is provided with an inclined plate arranged in an inclined manner, lower ends of the limiting elastic pieces are in contact with the inclined plates, sides of the limiting frames that are close to the inclined plates are provided with auxiliary plates, and sides of the auxiliary plates that are away from the inclined plates are acute-angled inclined surfaces.

* * * * *